US012553261B2

(12) United States Patent
Vonaesch

(10) Patent No.: US 12,553,261 B2
(45) Date of Patent: Feb. 17, 2026

(54) SLIDING-DOOR SYSTEM

(71) Applicant: Inventio AG, Hergiswil (CH)

(72) Inventor: Jonas Vonaesch, Lucerne (CH)

(73) Assignee: INVENTIO AG, Hergiswil (CH)

( * ) Notice: Subject to any disclaimer, the term of this patent is extended or adjusted under 35 U.S.C. 154(b) by 276 days.

(21) Appl. No.: 18/560,115

(22) PCT Filed: May 4, 2022

(86) PCT No.: PCT/EP2022/061937
§ 371 (c)(1),
(2) Date: Nov. 10, 2023

(87) PCT Pub. No.: WO2022/243037
PCT Pub. Date: Nov. 24, 2022

(65) Prior Publication Data

US 2024/0240498 A1 Jul. 18, 2024

(30) Foreign Application Priority Data

May 17, 2021 (EP) .................................... 21173990

(51) Int. Cl.
*E05B 65/08* (2006.01)
*E05B 63/24* (2006.01)
*E05B 65/10* (2006.01)

(52) U.S. Cl.
CPC ........ *E05B 65/0835* (2013.01); *E05B 63/244* (2013.01); *E05B 63/248* (2013.01); *E05B 65/102* (2013.01)

(58) Field of Classification Search
CPC .. E05B 65/0835; E05B 63/244; E05B 63/248; E05B 65/102; E05B 65/08; E05B 19/02; E05C 3/124; E05C 19/002
See application file for complete search history.

(56) References Cited

U.S. PATENT DOCUMENTS 3,300,897 A * 1/1967 Wikkerink ............ E06B 3/5072 49/141
3,354,581 A * 11/1967 Kessner .................... E06B 3/50 49/327

(Continued)

FOREIGN PATENT DOCUMENTS

AT 507815 A1 8/2010
CN 1249387 A 4/2000

(Continued)

*Primary Examiner* — Christine M Mills
*Assistant Examiner* — Faria F Ahmad
(74) *Attorney, Agent, or Firm* — Shumaker, Loop & Kendrick, LLP

(57) ABSTRACT

A sliding-door system includes a sliding door, a door frame, and a locking system, wherein in a locked state, a first latch engages in an engagement notch of an anchor body locking the sliding door, and a bolt engages on the anchor body in an engagement region to prevent the anchor body from rotating about a rotational axis. An actuator moves the bolt out of the engagement region to switch the locking system from the locked state into an open state by rotating the anchor body about the rotational axis. A locking system emergency opening function is actuated by applying an emergency activation force to a first door leaf to move a lock substantially perpendicular to a surface of the first door leaf such that the engagement notch is slid out of the engagement region to enable the sliding door to open.

15 Claims, 6 Drawing Sheets

(56) References Cited

U.S. PATENT DOCUMENTS

| | | | | | |
|---|---|---|---|---|---|
| 3,758,140 | A * | 9/1973 | Prete, Jr. | E05C 3/122 292/DIG. 31 |
| 3,834,081 | A * | 9/1974 | Catlett | E05F 15/643 49/327 |
| 7,950,439 | B2 * | 5/2011 | Anderson | E05D 15/58 160/195 |
| 9,540,842 | B2 * | 1/2017 | Storr | E05B 65/0811 |
| 9,702,168 | B2 * | 7/2017 | Jadallah | E05B 63/0052 |
| 9,988,830 | B2 * | 6/2018 | Raz | E05C 1/12 |
| 10,280,678 | B1 * | 5/2019 | Rendon, Jr. | E06B 3/509 |
| 10,865,588 | B2 * | 12/2020 | Raz | E05C 3/124 |
| 11,959,302 | B2 * | 4/2024 | Rios | E05B 7/00 |
| 12,123,234 | B1 * | 10/2024 | Colligan | E05D 15/0604 |
| 12,291,892 | B2 * | 5/2025 | Raz | E05B 17/20 |
| 2002/0145292 | A1 * | 10/2002 | Furner | E05B 65/0835 292/341.16 |
| 2003/0057714 | A1 | 3/2003 | Brown | |
| 2009/0302617 | A1 * | 12/2009 | Schmid | E05B 65/10 292/92 |
| 2011/0203332 | A1 * | 8/2011 | Suh | D06F 37/42 70/91 |
| 2017/0254119 | A1 | 9/2017 | Raz | |
| 2018/0008120 | A1 * | 1/2018 | Dirnberger | D06F 37/42 |
| 2019/0017216 | A1 * | 1/2019 | Dirnberger | E05C 19/022 |
| 2019/0071895 | A1 * | 3/2019 | Raz | E05B 65/1046 |
| 2020/0056403 | A1 * | 2/2020 | Wong | E05B 47/0047 |
| 2020/0190875 | A1 * | 6/2020 | Raz | E05C 3/30 |
| 2020/0263452 | A1 * | 8/2020 | Raz | E05B 63/248 |
| 2021/0332621 | A1 * | 10/2021 | Raz | E05B 17/2007 |
| 2023/0272647 | A1 * | 8/2023 | Marsh | E05B 47/023 292/194 |
| 2024/0229530 | A1 * | 7/2024 | Vonaesch | E06B 3/5454 |
| 2024/0229531 | A1 * | 7/2024 | Vonaesch | E05D 15/10 |

FOREIGN PATENT DOCUMENTS

| | | | | |
|---|---|---|---|---|
| CN | 102677990 | A | 9/2012 | |
| CN | 104100144 | A | 10/2014 | |
| CN | 106639674 | A | 5/2017 | |
| CN | 207048494 | U | 2/2018 | |
| CN | 109209055 | A | 1/2019 | |
| CN | 209053534 | U | 7/2019 | |
| CN | 110552556 | A | 12/2019 | |
| DE | 564287 | C | 11/1932 | |
| DE | 2056394 | B1 * | 5/1972 | |
| DE | 3919458 | A1 * | 12/1990 | E05C 19/024 |
| DE | 10163061 | A1 | 6/2003 | |
| DE | 10163061 | B4 | 6/2003 | |
| DE | 102010019917 | A1 | 11/2011 | |
| EP | 1731703 | A2 | 12/2006 | |
| EP | 2871316 | A1 | 5/2013 | |
| EP | 2876241 | A1 | 11/2013 | |
| EP | 2813660 | A1 | 12/2014 | |
| EP | 3892810 | A1 * | 10/2021 | E06B 5/162 |
| JP | H09287333 | A | 11/1997 | |
| JP | 2010163792 | A | 7/2010 | |
| JP | 2018016967 | A | 2/2018 | |
| NL | 1029081 | C2 | 11/2006 | |
| WO | WO-2018065653 | A1 * | 4/2018 | E06B 3/4654 |
| WO | WO-2019049123 | A1 * | 3/2019 | E05C 3/124 |
| WO | WO-2022078840 | A1 * | 4/2022 | E05D 15/56 |

* cited by examiner

SLIDING-DOOR SYSTEM

FIELD

The invention relates to a sliding-door system with an emergency opening system, and a method for emergency opening of the sliding-door system.

BACKGROUND

Sliding-door systems comprise a sliding door, which is mounted such that it can be retracted into a wall, and a door frame which ensures the mounting of the sliding door and the anchoring on the building required for this purpose. The sliding door is installed between two, preferably plate-shaped, wall elements of a building wall, and has at least one door leaf, the outer surface of which forms the visible surface of the sliding door in a closed state. The door leaf is mounted on a guide member that is slidable in the closing and opening direction. The door leaf has approximately the dimensions of a door opening present in the associated wall element, and is slidable transversely to the outer surfaces of the wall elements such that, in the closed state of the sliding door, the visible surface of the door leaf is aligned with the visible surface of the associated wall element. Such doors or sliding doors are also referred to as concealed doors. Such sliding doors are usually provided with two door leaves mounted on the same guide member, wherein, in the closed state of the sliding door, the outer surface of the second door leaf is also aligned with the outer surface of the wall element assigned thereto. In the closed state, such sliding doors and in particular also the door openings can be seen only with difficultly, which is advantageous in terms of aesthetics.

DE 101 63 061 B4 discloses a sliding door which comprises a guide member which can be slid in the horizontal direction between two wall shells and on which two door leaves, which can be spread apart in opposite directions, are mounted. When the sliding door is in the closed state, the outer surfaces of the spread-apart door leaves are flush with the outer surfaces of the two visible surfaces of the wall. The guide member is slidable horizontally on a linear guide and is slidable by means of a traction means drive driven by an electric motor. At least one door leaf is connected to the slidable guide member in each case via handlebar levers, forming a parallelogram guide system, so that a distance, measured at a right angle to the outer surfaces of the wall elements, between the door leaf and the guide member, can be changed such that the outer surface of the door leaf can be positioned, in the open state of the sliding door, in the wall, i.e., between the two wall elements of the wall, and, in the closed state, in the door opening and in alignment with the outer surface of the wall element associated with the door leaf.

Such sliding doors can be used as entrance doors—by way of example, inter alia, for hotels, hotel rooms, co-working areas, meeting rooms, hospitals, hospital rooms, apartments, or office premises. Such doors therefore segregate a private area from a non-private area and are usually automatically locked or lockable in their closed state, in order to prevent unauthorized access to the private area. A power failure during the closed or locked state therefore means that the sliding door cannot be unlocked or opened by the electric drive.

SUMMARY

The invention is based upon the object of providing a sliding-door system having a locking device which, even in a state without power, enables opening or unlocking of the sliding door from a private space, but which, in contrast, cannot be unlocked from the non-private space.

According to a first aspect of the invention, the object is achieved by a sliding-door system. The sliding-door system has a sliding door, a door frame, and a locking system. The sliding door comprises a first door leaf and a second door leaf, which are mounted such that a distance between the first door leaf and the second door leaf is smaller in an open state of the sliding door than in a closed state of the sliding door. The locking system comprises a lock fastened to the sliding door and a locking part mounted on the door frame. In this case, the lock has an anchor body which is mounted so as to be rotatable about a rotational axis and has an engagement notch, and the closed part has a first latch. In a locked state of the locking system, the first latch engages the engagement notch of the anchor body in order to lock the sliding door, and a latch on the anchor body engages in an engagement region in order to prevent the anchor body from rotating about the rotational axis. The lock has an actuator which can move the bolt out of the region of engagement with the anchor body in order to bring the locking system, during normal operation, from the locked state into an unlocked state by the anchor body rotating about the rotational axis. The locking system has an emergency opening function which can be actuated by an emergency activation force. The emergency opening function releases the locking of the sliding door, by a movement of the lock which is brought about by the emergency activation force, wherein the movement direction of the lock is substantially perpendicular to the surface of the first door leaf, and the lock is slidable relative to the locking part so far that the engagement notch is slidable out of the engagement region of the first latch in order to thus make it possible to open the sliding door.

According to a second aspect of the invention, the object is achieved by a method for the emergency opening of a sliding-door system. The method for emergency opening of a sliding-door system according to the first aspect of the invention, comprising the steps of:

- applying the emergency activation force to the first door leaf,
- moving the first door leaf so that the distance between the first door leaf and the second door leaf is reduced,
- and simultaneously guiding the lock between the first door leaf and the second door leaf, so that the first door leaf and the lock move substantially in the same direction,
- emergency opening of the locking system, by the first latch being able to pass through the engagement notch of the anchor body.

The sliding door comprises a first door leaf and a second door leaf, both of which are mounted such that the distance between the first door leaf and the second door leaf can be reduced for opening the sliding door. When the sliding door is closed, the distance is again larger, so that the outer surfaces of the two door leaves typically lie flat to the surface of the wall. Typically, at least one of the two door leaves is thus flush with the wall surface on the wall side of this door leaf. Preferably, both door leaves are arranged flush on their respective wall side.

Preferably, the distance between the first door leaf and the second door leaf is defined as the distance between the planar outer surfaces of the two door leaves. In this case, a door leaf is preferably flush with the wall surface on the wall side of this door leaf. Preferably, both door leaves are arranged flush on their respective wall side.

In this case, the door frame is anchored to the building structure. The door frame serves to receive a guide rail and the locking part. As soon as the door locking system is unlocked, the sliding door can be opened.

The rotational axis of the anchor body preferably extends vertically. Thus, a possible orientation of the lock with respect to the locking part is omitted. Typically, the sliding door is adjustable in height. This shifts the position of the lock relative to the locking part. The orientation of the rotational axis of the anchor body allows the adjustment of the height without subsequently having to adjust the locking part or the lock, since both the lock can be positioned horizontally precisely with respect to the sliding door, and the locking part can be positioned horizontally precisely in the door frame. The locking system allows clearance in the vertical direction. The sliding-door system is preferably installed in a manner oriented in such a way that a person can pass through it horizontally. The door leaves are oriented vertically. The movement direction of the two door leaves from the open state to the closed state is substantially horizontal.

The emergency activation force is understood to mean a force which is applied to the first door leaf by a person. The person is typically attempting, from the inside of the sliding door, to reach the outside in an emergency. For this purpose, the person intuitively presses the door leaf of the sliding door. The force acting upon the door leaf as a result is to be understood then as an emergency activation force. This force can be translated and transmitted such that the force ultimately brings about the unlocking of the sliding door via a mechanical operative chain. The emergency can be due to failure of the power supply in the building. However, a fire event or other threat may also cause the person to wish to open the sliding door.

By applying the emergency activation force to the first door leaf, which is typically located on an inner or private side of the door, the first door leaf, which is aligned flush with the inner wall surface before the emergency activation force is applied, is easily pressed into the wall. Due to the inner structure of the sliding door, this sliding is at least partially transmitted to the lock. The transmission takes place, for example, via a parallelogram guide system and the guide member. The second door leaf of the sliding door remains still during this. Since the second door leaf remains still, but the first door leaf is slid by the emergency activation force, the emergency activation force causes a reduction in the distance between the first door leaf and the second door leaf.

Possible features and advantages of embodiments of the invention can be regarded, inter alia and without limiting the invention, as being based upon the concepts and findings described below.

According to a preferred embodiment of the sliding-door system, the emergency activation force is applied directly to the first door leaf of the sliding-door system.

In other words, the anchor plate is thus arranged such that the emergency opening functions, and the sliding door is unlocked, only by applying the emergency activation force to the first door leaf. In particular, the application of a force corresponding to the emergency activation force, of the same magnitude but in the opposite direction, to the second door leaf, causes no unlocking of the sliding door. The sliding door can therefore not be opened by pressing on the second door leaf. This is achieved by arranging the engagement notch of the anchor plate substantially on the side of the first door panel. It is advantageous here that the first door leaf is arranged on that side of the sliding door from which side an emergency opening of the sliding door is required. In particular, the first door leaf is arranged on the private side of the sliding door. The second door leaf is preferably attached to that side of the sliding door from which no emergency opening of the sliding door is permitted. In particular, the second door leaf is arranged on the publicly accessible, non-private, side of the sliding door.

In this case, the emergency activation force is to be applied directly to the first door leaf. No further elements, such as door latches or emergency unlocking levers, are actuated, but, rather, the emergency activation force is applied directly to the surface of the first door leaf.

The advantage is that the persons in the interior of the apartment or the office can leave the area even if the actuator cannot unlock the locking system because, for example, the power has failed. Since the emergency opening also functions non-destructively, it can be used both in a life-threatening emergency, such as in a fire situation, as well as when the door is to be opened in the event of a power failure or in the event of a fault of the door drive.

According to a preferred embodiment, the emergency activation force can be applied perpendicularly to the first door leaf of the sliding-door system.

This means that the emergency activation force can be applied substantially perpendicularly to the first door leaf. Advantageously, a person can thus simply press against the first door leaf and thereby cause the emergency opening of the door. Particularly in the case of the evacuation of several persons in a life-threatening emergency, it is important that the emergency opening of the sliding door be intuitive and fast to operate. Advantageously, pressing against the first door leaf is intuitively the first type of opening attempt by which a fleeing person would attempt to open the door.

In addition, this solution is aesthetically pleasing, since no emergency opening buttons or emergency opening handles must be attached to or at the door.

According to a preferred embodiment, the lock and the locking part are designed such that a counter movement of the lock against the movement direction is blocked, and that the second door leaf pauses and the sliding door remains locked, if a compressive force of the same magnitude as the emergency activation force is applied to the second door leaf.

In this case, the movement direction describes the movement direction of the lock which is brought about by the emergency activation force.

In other words, it is therefore not possible to bring about an emergency opening by applying a force equivalent to the emergency activation force to the second door leaf, i.e., from the non-private side of the sliding door. In the closed state of the sliding door, the position of the lock relative to the locking part is limited on one side. This means that a relative movement of the lock in a direction towards the second door leaf leads, as described above, to an emergency opening of the sliding door, while a relative movement of the lock in a direction towards the first door leaf is prevented. This one-sided limitation of the relative position is preferably achieved in structural terms by means of stop surfaces on the lock and locking part.

The sliding door also remains locked if a compressive force of a greater magnitude than the emergency activation force is applied to the second door leaf. In this case, the compressive force can be of any desired magnitude, as long as it is less than the strength of the sliding-door system.

According to a preferred embodiment, the anchor body is plate-shaped.

As a result, the anchor plate is very easy and cost-effective to produce from a plate-shaped workpiece. Preferably, the anchor plate is punched, lasered, milled, water-jet cut, or eroded out of a plate-shaped piece of metal or a metal strip. Alternatively, the anchor plate may be pressed, forged, or cast.

According to a preferred embodiment, the anchor body is substantially circular, and an outer region of the anchor body has a substantially sector-shaped cutout, the two ends of which in particular form the engagement region and the engagement notch.

This shaping allows the required functions of the anchor part to be realized with a very simple geometry. In addition, the circular contour of the anchor plate brings about simple centering of the lock in the locking part.

According to a preferred embodiment, the anchor body is fastened to the lock such that the rotation about the rotational axis is limited by two stops, such that the locking system keeps the door closed at the first stop, and the anchor body can pass the latch at the second stop.

The two stops thus define the extreme positions that the anchor body must be able to reach. The rotation of the anchor body is limited between these two stops. A further rotation of the anchor body beyond these extreme positions, i.e., beyond the first or second stop position, is neither necessary nor advantageous.

According to a preferred embodiment, the anchor body is connected to the lock via a spring, such that the spring exerts a preload force on the anchor body, which presses the anchor body against the first stop.

As a result, the anchor body almost always abuts the first stop. Therefore, the bolt can engage the engagement region as soon as this is attached. The anchor body is also held in a defined position during closing of the sliding door. The first latch can therefore also always be pressed back with the same degree of precision. After passing the engagement notch, the sliding door is securely locked, since the engagement notch is located in the correct position in order to engage or mesh with the first latch, such that the door is securely locked.

According to a preferred embodiment, the actuator is designed as an electric drive.

The electric drive is easily controllable by means of an electronic system. Preferably, it is a solenoid. Preferably, the electric drive is connected directly to the bolt, and in particular on a common effective axis.

According to a preferred embodiment, a guide member to which the lock is fastened is mounted—in particular, via a parallelogram guide system—in such a way that the guide member is always located in the middle between the first door leaf and the second door leaf.

This allows a symmetrical design of the sliding-door system. The individual parts to be used are more uniform due to the symmetrical design. In particular, the parallelogram guide system, the door frame, or, very generally, profiles from which the sliding-door system is produced are more uniform due to the symmetrical design. Therefore, the production costs are lower.

According to a preferred embodiment, the locking part has a second latch opposite the first latch, wherein the locking part is insertable between the first latch and the second latch.

The second latch serves to secure the engagement between the first latch and the anchor body in the locked state. The second latch defines, by means of the preload force of the latch spring of the second latch, what the magnitude of the emergency activation force shall be that causes an emergency opening of the sliding door. Typically, the emergency activation force to be applied to the first door leaf is significantly greater than the preload force of the latch spring. The second latch is slid against the preload force of the latch spring, in order to slide the engagement notch of the anchor body out of the engagement region of the first latch, and thereby unlock the sliding door.

The second latch can be of the same design as the first latch. This brings about symmetrical centering during insertion of the lock into the locking body. A uniform type of latch can also be installed on both sides in the locking part.

Alternatively, the second latch can be optimized such that the emergency activation force to be applied is adapted to the force that can be applied by a person. As a result, for the second latch, a latch spring can be used which is stronger than the latch spring of the first latch, in order to hold the sliding door securely locked in other operating situations. The latch spring of the first latch is less strong in this case, in order to provide only a small resistance during locking of the anchor body. This makes locking easy.

According to a preferred method, the emergency opening comprises the step of:

- pressing the second latch through the lock as a result of the movement of the lock caused by the emergency activation force.

The second latch allows a defined force to be fixed as the emergency activation force. The more strongly a latch spring preloads the second latch, the more strongly a person must press against the first door leaf in order to be able to open the sliding door.

According to a preferred method, the second door leaf remains substantially in a first phase of the reduction in the distance between the first door leaf and the second door leaf before the sliding door is unlocked.

In a first phase of the reduction in the distance between the first door leaf and the second door leaf, before the sliding door is unlocked, the first door leaf is slid only a few millimeters—typically less than 5 mm. After this first phase, i.e., after the door is unlocked, initially, the distance between the two door leaves is reduced further, and then the sliding door is moved substantially horizontally and slid into the open state. During this movement into the open state, the second door leaf also moves.

The direction of the emergency opening, i.e., the side of the sliding door from which the emergency opening can be actuated, can be changed by the lock being turned around. The lock is attached to the guide member using one or more fastening means, such as screws. In order to turn the lock around, the fastening means is released. The lock is removed from the guide member or a holder on the guide member in the sliding direction of the sliding door. The lock is then rotated by 180°, so that the engagement notch is now located on the other side of the sliding door. The lock is again inserted into the guide member or the holder on the guide member and fastened.

The lock can be turned only if the sliding door is in the open state. This ensures that the direction of the emergency opening can be carried out only by persons who can bring the sliding door into the open state. Furthermore, the turning of the lock can be secured against unauthorized turning by further safety devices, such as a lock cylinder. The locking part can be turned similarly to the lock. A fastening means of the locking part on the door frame is released, the locking part is removed, turned, pushed in again, and fastened again. The locking part is only turned if the latch spring of the first latch and the latch spring of the second latch are designed to be of different strengths. If the latch spring of the first latch and the latch spring of the second latch are identical, turning is not necessary.

Further advantages, features, and details of the invention can be found in the following description of embodiments and with reference to the drawings, in which like or functionally like elements are provided with identical reference signs. The drawings are merely schematic and are not to scale.

DETAILED DESCRIPTION

Figure 1:
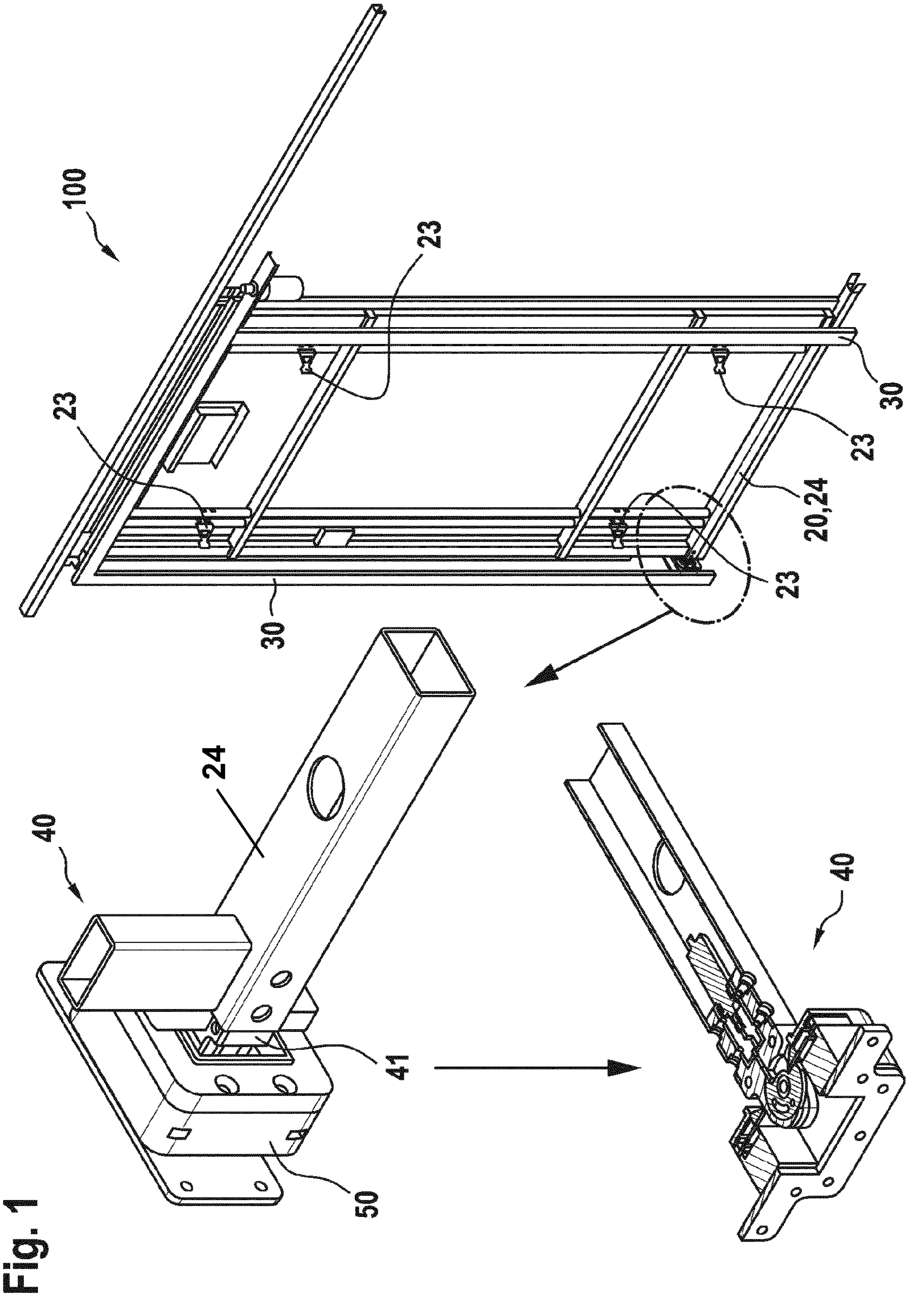
FIG. 1 shows a sliding-door system.

FIG. 1 shows a sliding-door system 100. The parallelogram guide system 23 is attached to a guide member 24 of the sliding door 20. The door leaves, not shown in FIG. 1, are attached to this parallelogram guide system. The sliding door 20 is mounted slidably, so that it can be slid from an open state into a closed state and back. In the closed state, the door leaves are so far from one another that the door leaves end flush with the wall in which the sliding door 20 is embedded. In the open state, the door leaves are at a smaller distance than in the closed state, such that the sliding door can be retracted into a wall. The sliding door also has a door frame 30 which is rigidly connected to the wall.

In order to be able to hold the sliding door 20 in a closed state, the sliding-door system 100 has a locking system 40 at the lower left corner of the frame 30 and shown in enlarged detail including a horizontal sectional view. The locking system 40 consists of a lock 41 which is fastened to the sliding door, and a locking part 50 which is fastened to the door frame 30.

Figure 2:
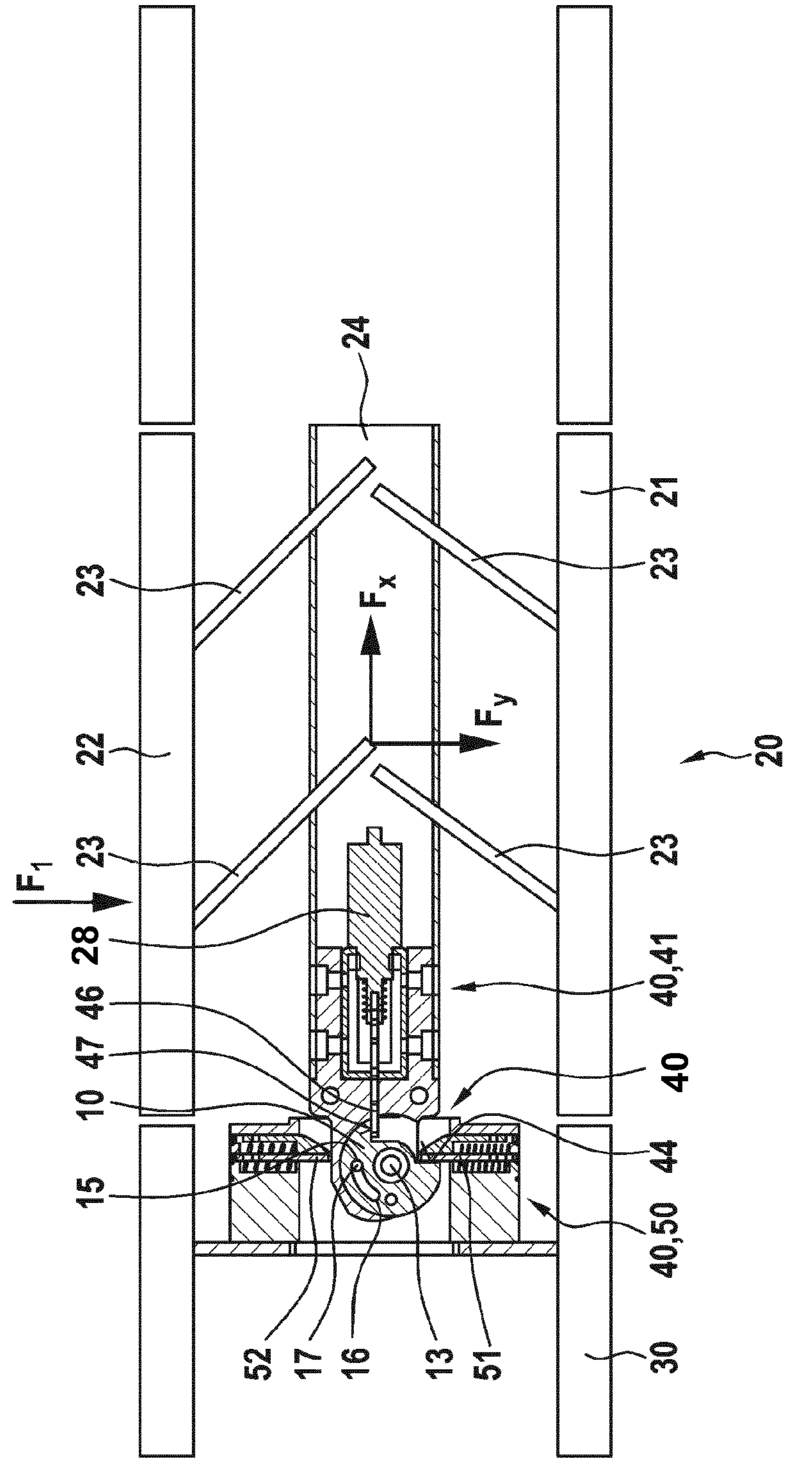
FIG. 2 is a section through a sliding-door system.

FIG. 2 is a horizontal sectional view of the sliding-door system from FIG. 1. The sliding-door system is shown in a locked state.

In addition to FIG. 1, FIG. 2 shows the first door leaf 21 and the second door leaf 22. In this case, the first door leaf 21 is the inner door leaf, i.e., typically in the apartment or in the office, while the second door leaf 22 typically is the outer door leaf, i.e., outside, on the corridor in front of the office or the apartment.

If a person presses on the second door leaf 22 and applies a force corresponding to the emergency activation force $F_1$, the second door leaf 22 moves only very little in the $F_y$ direction. Due to the symmetrical parallelogram guide system 23, the guide member 24 moves exactly half as far in the $F_x$ direction. This movement is stopped by the anchor body 10 abutting the locking part 50. The first latch 51 would be pressed slightly in this case. The sliding door 20 is locked, since the engagement notch 44 is securely engaged or meshed with the first latch 51. However, the door also cannot be pushed in, since the lock is securely supported in the locking part 50. In an upper region of the sliding door 20, this is supported by the guide rail. The door is thus securely protected against break-in.

Figure 3A:
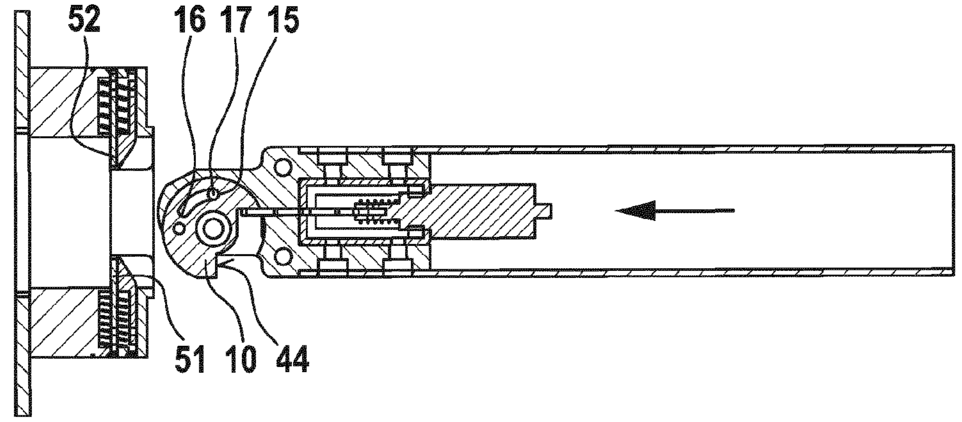
FIGS. 3*a*-3*c* show the closing of the sliding-door system.
Figure 3B:
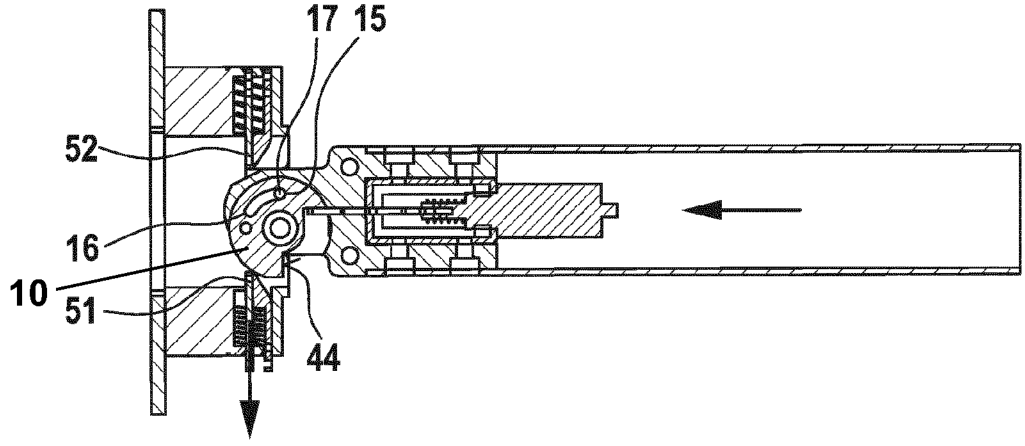
Figure 3C:
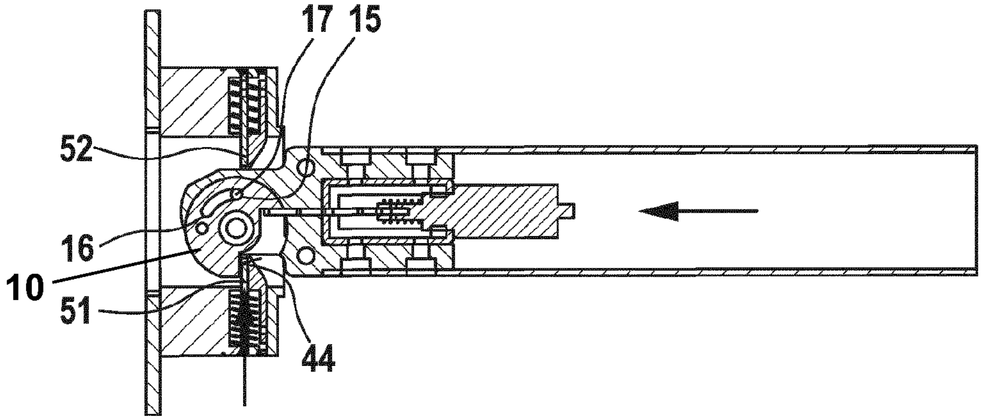

FIGS. 3*a*-3*c* show the process of closing the sliding door 20. FIG. 3*a* shows the state before closing. A spring (not shown) presses the anchor body 10 against a pin 17 by a first stop 15. When the door is open, the anchor body 10 is thus located in the orientation shown. FIG. 3*b* shows a first contact between the anchor body 10 and the first latch 51. Even if large frictional forces occur at this contact, the anchor body 10 cannot rotate further, since it is already located on the first stop 15. In FIG. 3*c*, the first latch 51 is latched in behind the anchor body 10 again, and the sliding door 20 is securely locked.

Figure 4A:
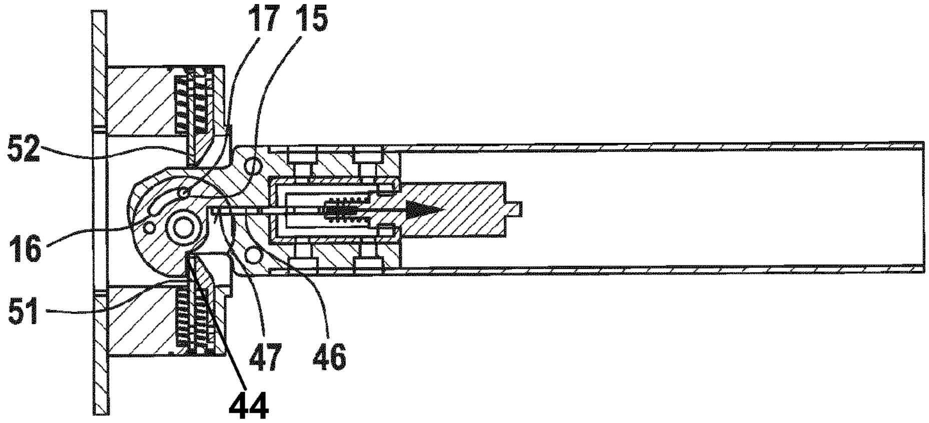
FIGS. 4*a*-4*c* show the normal unlocking of the sliding-door system.
Figure 4B:
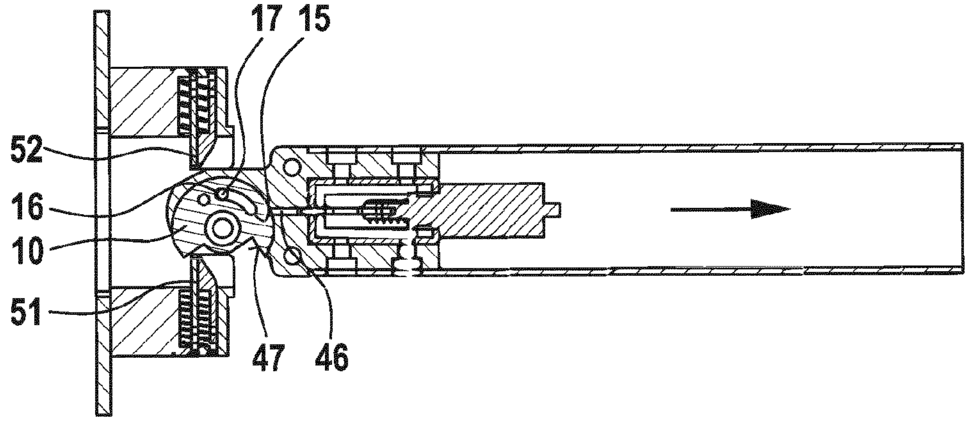
Figure 4C:
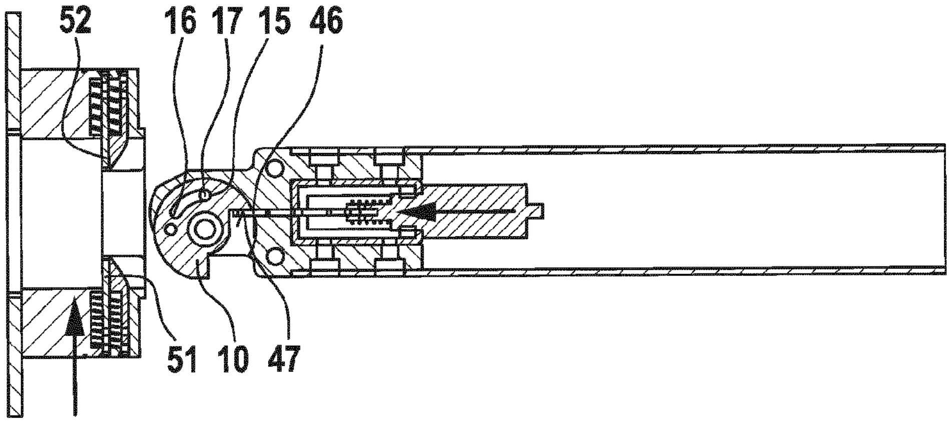

FIGS. 4*a*-4*c* show the normal unlocking of the sliding door 20. The spring (not shown) still presses the first stop 15 of the anchor body 10 against the pin 17. In this case, the spring force is selected to be large enough that this configuration is also maintained if tensile forces act upon the guide member when the sliding door is closed. Such tensile forces can be brought about, for example, by the contact pressure of seals on the door panels. In the described configuration (FIG. 4*a*), there is a small gap, i.e., a clearance, between the bolt 46 and the engagement region 47. In the case of large tensile forces, this gap would be eliminated, and the bolt 46 would hold the door locked by the engagement notch 44 engaging or meshing firmly with the first latch 51. However, if no large tensile forces are applied, the bolt 46 can be removed from the engagement region 47 with very little force (FIG. 4*b*). The anchor body 10 can now be rotated by a tensile force, and the sliding door can be opened (FIG. 4*c*).

Figure 5A:
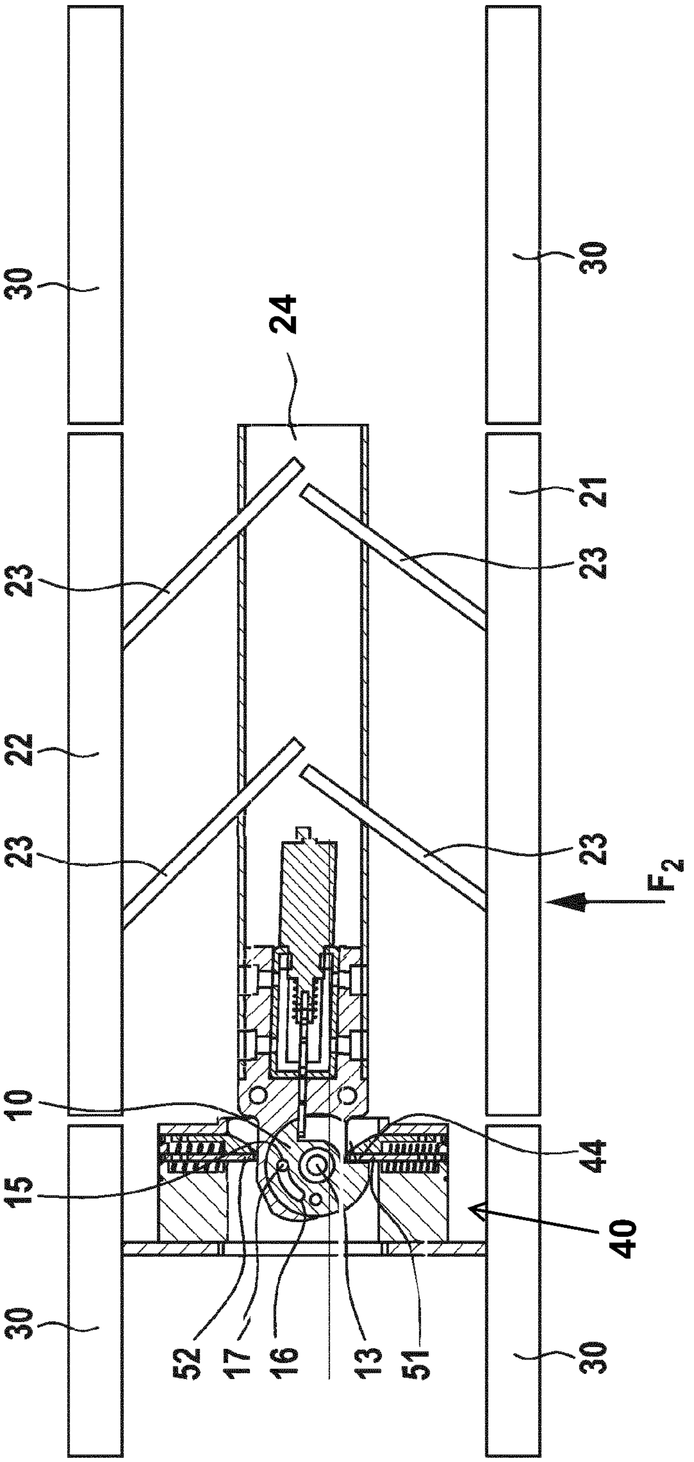
FIGS. 5*a*-5*c* show the emergency unlocking of the sliding-door system.
Figure 5B:
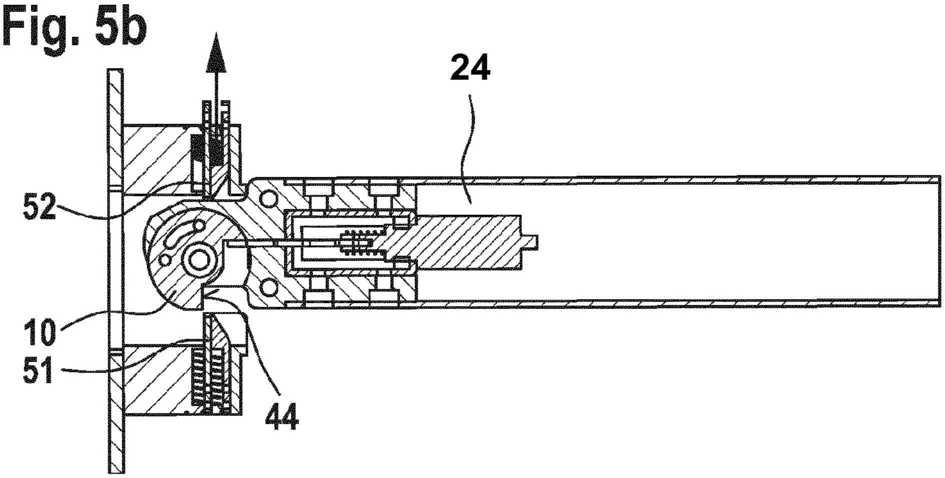
Figure 5C:
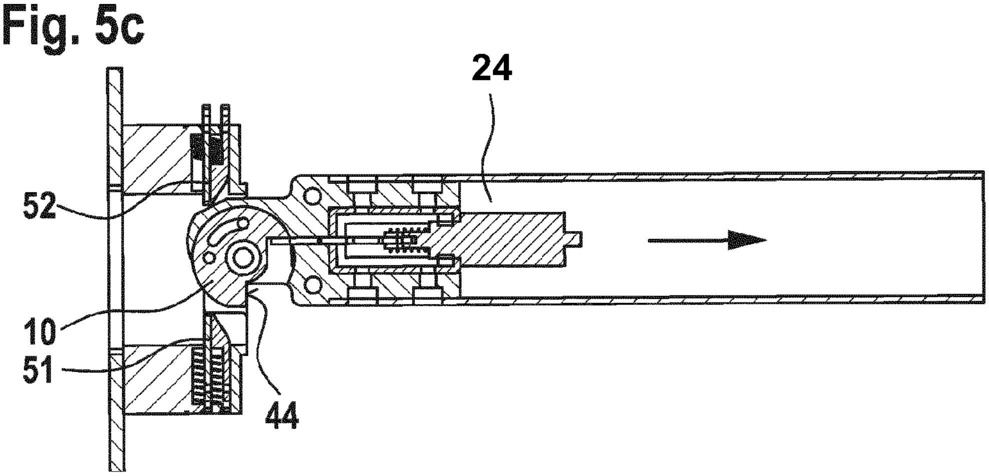

FIGS. 5*a*-5*c* show the method of the emergency opening. Typically, the emergency opening is required so that a person can flee a room, office, or apartment. However, it can also be required if, for example, the actuator is faulty, or simply just a power failure has occurred. For this purpose, the person presses the door leaf located in front of them, as soon as they reach the door. The person thus applies an emergency activation force $F_2$ to the first door leaf 21. The parallelogram guide system 23 forwards the emergency activation force to the guide member 24. This guide member 24 is guided against the locking system 40, above, by the guide rails and, below, by a guide. The guide body is slightly resilient, so that the guide body can deform slightly and thus be slid. As a result, the second latch 52 is pushed back, and the engagement or the meshing between the first latch 51 and the engagement notch 44 is released, as is shown in FIG. 5*b*. Since the sliding door 20 is now no longer locked, the guide member 24, and the complete sliding door 20, can be slid along the guide rail and thus opened.

An unauthorized person who is attempting to access a private area has access only to the outer, non-private door leaf. This is typically the second door leaf 22. The sliding door 20 cannot be opened in this way. Pressing on the sliding door on the second door leaf 22 slides the guide member 24 at most until it abuts the outer edge of the engagement notch 44 next to the first latch 51. Pulling on the second door leaf 22, e.g., by means of a vacuum lifter, also only pulls the second door leaf more strongly into the door frame 30. The second door leaf 22 abuts the door frame 30 and then compresses only the seals (not shown).

Figure 6:
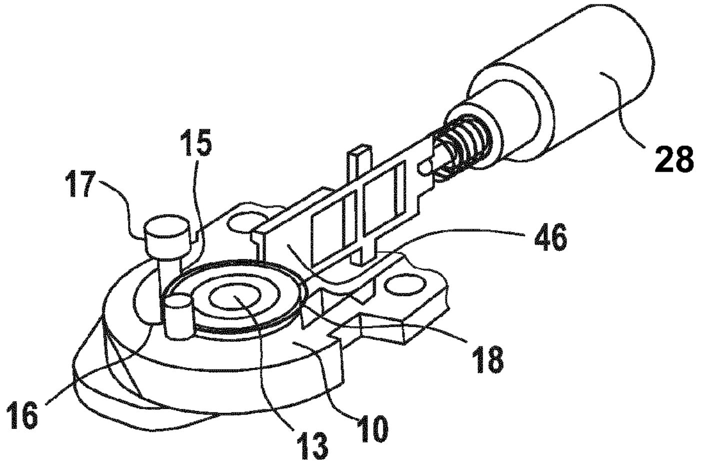
FIG. 6 is a detail view of the anchor body.

FIG. 6 is an isometric view of the most important components—in particular, the anchor body 10 together with its rotational axis 13. The first stop 15 and the second stop 16 are realized as the ends of a milled-out portion, wherein a pin 17 is fastened in the milled-out portion. In this case, the spring 18 clamps the anchor body 10 into a position in which the pin 17 rests against the first stop 15. The bolt 46 can be actuated by the actuator 28.

Finally, it should be noted that terms such as "having," "comprising," etc., do not preclude other elements or steps, and terms such as "a" or "one" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A sliding-door system comprising:

a door frame;

a sliding door mounted in the door frame, the sliding door including a first door leaf and a second door leaf opposite the first door leaf, wherein a distance between the first door leaf and the second door leaf in an open state of the sliding door is smaller than a distance between the leaves in a closed state of the sliding door;

a locking system including a lock fastened to the sliding door and a locking part mounted on the door frame;

wherein the lock has an anchor body mounted to rotate about a rotational axis, the anchor body having an engagement notch, and the locking part having a first latch;

wherein, in a locked state of the locking system, the first latch engages in the engagement notch of the anchor body thereby locking the sliding door, and a bolt engages on the anchor body in an engagement region thereby preventing the anchor body from rotating about the rotational axis, the lock having an actuator that moves the bolt out of the engagement region thereby moving the locking system from the locked state into an open state by the anchor body rotating about the rotational axis; and wherein the locking system has an emergency opening function actuated by an emergency activation force, the emergency opening function operating, by a movement of the lock brought about by the application of the emergency activation force to the sliding door, to release the locking of the sliding door, wherein a movement direction of the lock is perpendicular to a surface of the first door leaf, and the lock slides relative to the locking part such that the engagement notch slides out of the engagement region of the first latch enabling opening of the sliding door.

2. The sliding-door system according to claim 1 wherein the emergency activation force is applied directly to the first door leaf of the sliding door.

3. The sliding-door system according to claim 2 wherein the emergency activation force is applied to the first door leaf of the sliding door system perpendicular to the surface of the first door leaf.

4. The sliding-door system according to claim 1 wherein when a compressive force of a same magnitude as the emergency activation force is applied to the second door leaf, the lock and the locking part block a counter movement of the lock against the movement direction, the second door leaf pauses, and the sliding door remains locked.

5. The sliding-door system according to claim 1 wherein the anchor body is plate-shaped.

6. The sliding-door system according to claim 1 wherein the anchor body has a circular contour and an outer region of the anchor body has a sector-shaped cutout extending between two ends, one of the ends forming the engagement region and another of the ends forming the engagement notch.

7. The sliding-door system according to claim 1 wherein the anchor body is fastened to the lock and has a first stop and a second stop limiting rotation about the rotational axis, wherein the first latch keeps the sliding door closed when the anchor body is at the first stop and the anchor body passes the first latch when the anchor body is at the second stop.

8. The sliding-door system according to claim 7 wherein the anchor body is fastened to the lock by a spring that exerts a preload force on the anchor body pressing the anchor body against the first stop.

9. The sliding-door system according to claim 1 wherein the actuator is an electric drive.

10. The sliding-door system according to claim 1 wherein the locking part has a second latch opposite the first latch and the anchor body is adapted to be insertable between the first latch and the second latch.

11. The sliding-door system according to claim 1 including a guide member, on which the lock is fastened, is mounted between the first door leaf and the second door leaf.

12. The sliding-door system according to claim 11 wherein the guide member is mounted by a parallelogram guide system.

13. A method for emergency opening of a sliding-door system, the method comprising the steps of:

applying an emergency activation force as a compressive force on the first door leaf of the sliding-door system according to claim 1;

moving the first door leaf such that a distance between the first door leaf and the second door leaf is reduced and simultaneously guiding the lock of the locking system such that the first door leaf and the lock move in a same direction; and emergency opening the locking system by passing the first latch through the engagement notch of the anchor body.

14. The method for emergency opening of a sliding-door system according to claim 13 including a step of pressing the second latch through the lock as a result of the movement of the lock caused by the application of the emergency activation force.

15. The method for emergency opening of a sliding-door system according to claim 13 wherein, in a first phase of reducing the distance between the first door leaf and the second door leaf, before the sliding door is unlocked, the second door leaf remains substantially still.

* * * * *